US012493674B2

(12) United States Patent
Breitling et al.

(10) Patent No.: US 12,493,674 B2
(45) Date of Patent: Dec. 9, 2025

(54) SYSTEMS AND METHODS FOR AUTOMATIC IDENTIFICATION OF TEXT FIELDS AND DATA TYPE

(71) Applicant: LEXISNEXIS RISK SOLUTIONS FL INC., Boca Raton, FL (US)

(72) Inventors: Julian Breitling, Ulm (DE); Philip Lindblad, Lidingö (SE); Per Burström, Luleå (SE); Tony Libell, Luleå (SE)

(73) Assignee: LexisNexis Risk Solutions FL Inc., Boca Raton, FL (US)

( * ) Notice: Subject to any disclaimer, the term of this patent is extended or adjusted under 35 U.S.C. 154(b) by 273 days.

(21) Appl. No.: 18/491,950

(22) Filed: Oct. 23, 2023

(65) Prior Publication Data
US 2024/0265075 A1 Aug. 8, 2024

Related U.S. Application Data

(60) Provisional application No. 63/482,865, filed on Feb. 2, 2023.

(51) Int. Cl.
*G06F 21/31* (2013.01)
*G06N 20/00* (2019.01)

(52) U.S. Cl.
CPC ............. *G06F 21/31* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 11,238,223 | B2* | 2/2022 | Nuolf | .............. G06F 8/33 |
| 11,429,787 | B2* | 8/2022 | Li | .............. G06F 40/274 |
| 12,229,640 | B2* | 2/2025 | Finkelshtein | ........... G06F 3/038 |
| 2020/0110842 | A1* | 4/2020 | Teo | .............. G06F 16/24575 |
| 2023/0111999 | A1* | 4/2023 | Thirumal | .............. G06F 18/23 |
| | | | | 706/12 |

* cited by examiner

*Primary Examiner* — Atta Khan
(74) *Attorney, Agent, or Firm* — TROUTMAN PEPPER LOCKE LLP; James E. Schutz; Mark Lehi Jones

(57) ABSTRACT

Systems and methods are provided for automatically generating unique identifiers for text fields and determining the type of information of a specific text field in an online user journey. The method identifies a data type identifier for each text field by training on historical sessions from many user interactions to group text fields, even with randomly generated IDs, and based on the metadata associated with the text fields. The method can predict the data type for new data and can enable the automatic selection and application of a correct keystroke dynamics algorithm for authentication and fraud detection.

20 Claims, 10 Drawing Sheets

```
<!-- login -->
<!-- end overview --><div class="section">
<div id="overview-container">
    <h1 class="form-title"><img id="login-logo" src="./img/logo_blue.svg"></h1>
    <form method="post" action="/Dashboard/Login">
        <input type="text" name=​    placeholder=​    autofocus="">
        <input type="text" name=​    placeholder=​ >
        <input type="hidden" name= value="17D824322fA8C15C6D84DC2F84563
        <input type="password" name=​    placeholder=​ >
        <input type="submit" value="Login"/>
    </form>
</div>
</div>
```

SYSTEMS AND METHODS FOR AUTOMATIC IDENTIFICATION OF TEXT FIELDS AND DATA TYPE

CROSS-REFERENCE TO RELATED APPLICATIONS

This application claims priority under 35 U.S.C. 119 to U.S. Provisional Patent Application No. 63/482,865 entitled "Systems and Methods for Automatic Identification of Text Fields and Data Type," filed 2 Feb. 2023, the contents of which are incorporated by reference in their entirety as if fully set forth herein.

FIELD OF THE DISCLOSED TECHNOLOGY

The disclosed technology relates to behavioral biometrics, and more particularly to the automatic identification of text fields and determination of the type of information associated with specific text fields for correctly assessing keystroke dynamics for authentication and/or fraud detection.

BACKGROUND

When collecting behavioral biometrics data, such as keystroke events, there is often metadata associated with such events that can provide useful information. One example of metadata is the unique identifier for each text field in browser and/or in certain mobile applications. To apply a correct behavioral biometrics analysis to a user's interaction with text fields, it is vital to know which key events came from the username text field, which key events came from the password text field, etc., otherwise, a wrong behavioral sub-profile may be used for each field and user.

Many modern app design frameworks such as JavaScript randomly generate unique field identifiers. In certain instances, unique field identifiers may be randomly generated on each deployment, at each time the project is built, or even each time a new page is loaded. Randomizing the identifiers can improve the security of a webpage, but it can make it difficult to determine the type of field for which text is being entered and can require a great deal of manual work to identify and set up the behavioral biometrics service to analyze the user interactions.

The definition and maintenance of a user journey during an online transaction takes place manually by assigning HTML IDs or CSS Tags to predefined categories of functional input data types like account numbers, addresses, specific names of the text field, etc. But in general, there is not an existing plug-and-play solution for the automatic selection of behavioral models to appropriately handle different text field types. As a trivial example, one may consider the case where a user pastes information into a field. If a user pastes their first name into a name field, it could be an indication of potential fraud and may warrant a completely different risk assessment than if an IBAN number is pasted into a field. An IBAN number is something users generally do not know by heart and often they are copied from electronic invoices, etc. Thus, for each type of field, different sets of behavioral biometrics models may need to be used to get satisfactory results. Manual maintenance becomes infeasible or impossible when UI/app is updated frequently and/or field names/Ids are generated dynamically. Behavioral biometrics algorithms need to train and match a sub-profile for the particular text field to be useful, and this becomes difficult or impossible if the field names/identifiers change.

Since the user interface may change as a service provider updates the page, adding specific IDs for purposes of using behavioral biometrics can interfere with existing logic when integrating new applications.

A need exists for the automatic identification of text fields and determination of the type of information associated with specific text fields for correctly assessing keystroke dynamics for authentication and/or fraud detection.

BRIEF SUMMARY

In accordance with certain exemplary implementations of the disclosed technology, methods, and systems are provided for automatically generating unique identifiers for text fields associated with online website interactions. The method can include a training phase and a classification phase. In the training phase, the method can include receiving metadata associated with text fields of a monitored page from multiple users of a website; constructing, from the received metadata, one or more metadata feature vectors describing the text fields; clustering by similarity, the one or more metadata feature vectors into partitioned functional groups, each of the partitioned functional groups having an associated centroid. In the classification phase, the method can include receiving new field data; constructing, from the new field data, one or more data feature vectors; classifying the new field data based on applying a statistical distance metric to compare the one or more data feature vectors to the centroids of the functional groups; constructing a text field dataset using the one or more data feature vectors having contextual pattern similarities; labeling the text field dataset based, at least in part, on the functional groups; and selecting a keystroke dynamics algorithm based on the label. The method includes applying the selected keystroke dynamics algorithm to the new field data for authentication or fraud detection.

Another method is provided for automatically generating unique identifiers for text fields associated with online website interactions. In accordance with certain exemplary implementations of the disclosed technology, the method can include monitoring one or more text fields of a webpage; receiving field data associated with the one or more text fields; constructing, from the field data, one or more data feature vectors; classifying the field data based on corresponding functional groups; constructing a text field dataset using the one or more data feature vectors having contextual pattern similarities; labeling the text field dataset based, at least in part, on the functional groups; automatically selecting a keystroke dynamics algorithm based on the labeling; processing the field data using the keystroke dynamics algorithm; and outputting an indication of authentication or fraud based on the processing.

A system is provided for collecting behavioral biometrics data, JavaScript events, and text field metadata for automatically generating unique identifiers for text fields associated with online website interactions. The system includes a processor; a JavaScript SDK module configured for collecting data and metadata of a monitored page from multiple users of the website; a feature construction module configured for extracting and constructing feature vectors from text fields of received data; a clustering module configured for partitioning the data into functional groups having high similarity; a feature selection module configured for selecting features of the feature vectors across multiple users to classify new field data in a classification phase; a comparison module configured for comparing new field data feature vectors to created centroids of the functional groups using a statistical distance metric; a classification module configured for classifying the new field data based on the comparison to the centroids; a matching module configured for matching the classified field data against existing profiles; a dataset construction module configured for constructing a dataset of text fields by constructing feature vectors targeting data type separation that have similar contextual patterns; a labeling module configured for labeling text fields with names based on functional groups from the clustering; and a behavioral biometrics module configured to analyze keystroke dynamics.

Another method is provided for automatic determination of a type of information in a text field associated with online website interactions. The method can include collecting, from a plurality of user devices, keystroke data related to user interaction with text fields of a monitored page from multiple users of a website; constructing feature vectors from data entered into the text fields, the feature vectors representing data type separations having similar contextual patterns; applying a clustering algorithm to the feature vectors to create centroids for each distinct contextual pattern into functional groups; and training one or more user profiles for each functional group.

In accordance with certain exemplary implementations of the disclosed technology, methods, and systems are provided for automatic determination of a type of information in a text field associated with online website interactions. The method can include a training phase and a classification phase. In the training phase, the method can include collecting, from a plurality of user devices, keystroke data related to user interaction with text fields of a monitored page from multiple users of a website; constructing feature vectors from data entered into the text fields, the feature vectors representing data type separations having similar contextual patterns; applying a clustering algorithm to the feature vectors to create centroids for each distinct contextual pattern into functional groups; and training one or more user profiles for each functional group. In a classification phase, the method can include receiving new field data; constructing, from the new field data, one or more data feature vectors; classifying the new field data based on applying a statistical distance metric to compare the one or more data feature vectors to the centroids of the functional groups; determining the type of the new field data based on a minimum statistical distance of the one or more data feature vectors to the centroids of the functional groups; matching the new field data against a corresponding profile for a user; selecting a keystroke dynamics algorithm based on the type of the new field data; and applying the selected keystroke dynamics algorithm to the new field data for authentication or fraud detection.

A system is provided for automatic determination of a type of information in a text field of an online user journey. The system includes a processor; a data collection module configured for collecting text field keystroke data from user devices; a data processing module configured for constructing a dataset from the text fields by constructing feature vectors that target data type separation having similar contextual patterns; a clustering module configured to apply one or more clustering algorithms to the feature vectors to cluster each distinct contextual pattern into functional groups, each functional group comprising an associated centroid; a training module for training user profiles for each functional group; a classification module configured for classifying feature vectors associated with new field data based on a comparison of new field data feature vectors with centroids of the functional groups; a matching module configured for matching the new field data against a user profile; a behavioral biometrics module configured for extracting feature vectors from new text data based on one or more of keypress times, key flight times, key rollover times, durations spent waiting, typing, navigating, and control keys used; a clustering module configured for partitioning the feature vectors into functional groups having similar data type; and a comparison module configured for classifying new feature vectors by comparing the new feature vectors to the centroids of the functional groups.

The disclosed technology further includes a non-transitory computer readable medium having stored thereon software instructions that, when executed by a processor, cause the processor to perform a method that includes a training phase and a classification phase. In the training phase, the software instructions cause the processor to perform a method of collecting, from a plurality of user devices, keystroke data related to user interaction with text fields of a monitored page from multiple users of a website; constructing feature vectors from data entered into the text fields, the feature vectors representing data type separations having similar contextual patterns; applying a clustering algorithm to the feature vectors to create centroids for each distinct contextual pattern into functional groups; and training one or more user profiles for each functional group. In the classification phase, the software instructions cause the processor to further perform the method including receiving new field data; constructing, from the new field data, one or more data feature vectors; classifying the new field data based on applying a statistical distance metric to compare the one or more data feature vectors to the centroids of the functional groups; determining the type of the new field data based on a minimum statistical distance of the one or more data feature vectors to the centroids of the functional groups; matching the new field data against a corresponding profile for a user; selecting a keystroke dynamics algorithm based on the type of the new field data; and applying the selected keystroke dynamics algorithm to the new field data for authentication or fraud detection.

Certain implementations of the disclosed technology will now be described with the aid of the following drawings and detailed descriptions.

BRIEF DESCRIPTION OF THE DRAWINGS

FIG. 5 is an example illustration of HTML code when random field names are used. The HTML tags that encode the elements into the page are still available and can comprise a part of the feature vector for training the classifier to correctly model the target IDs, in accordance with certain exemplary implementations of the disclosed technology.

Figure 1:
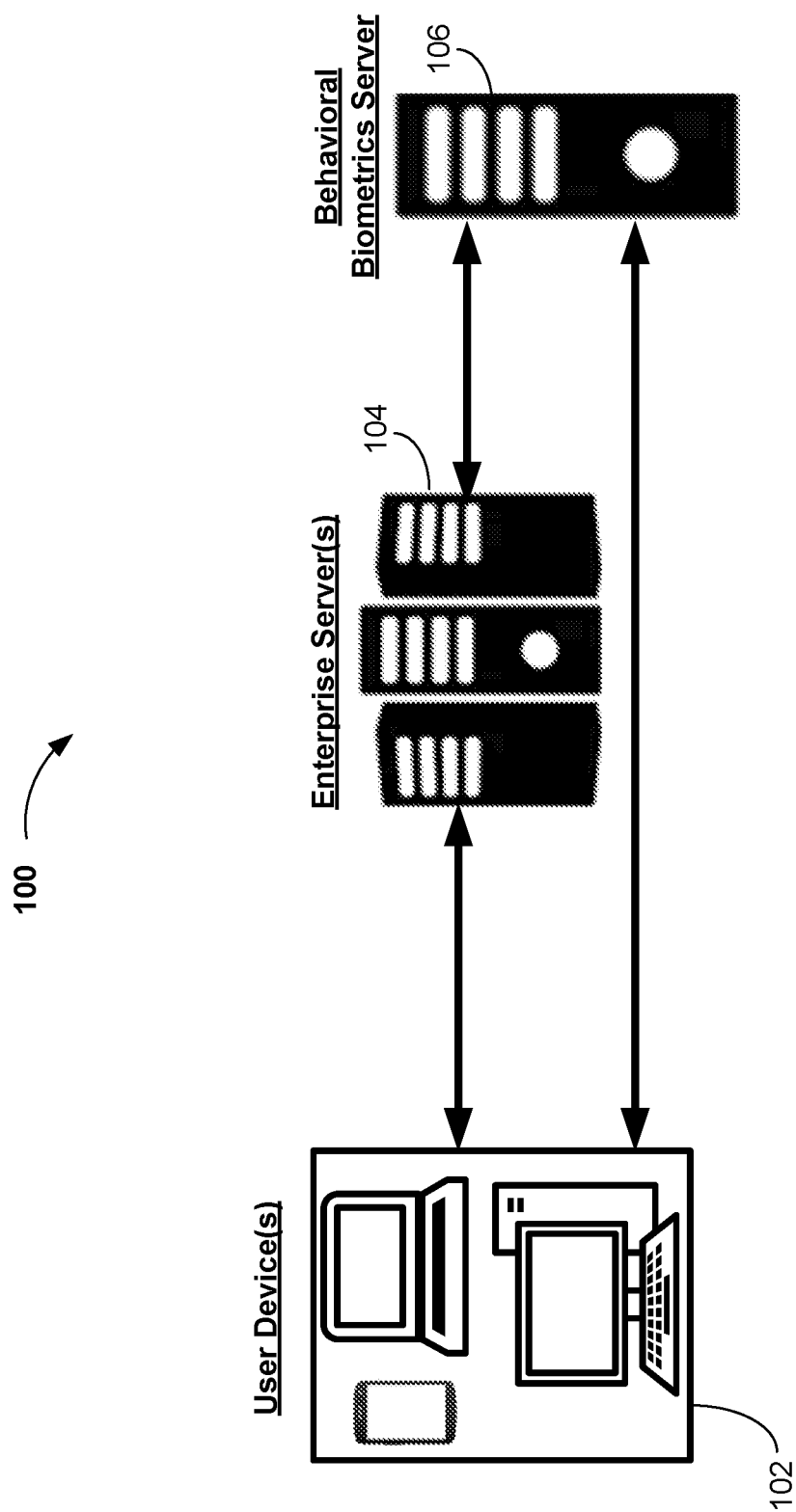
FIG. 1 is a simplified block diagram of an example system, in accordance with certain exemplary implementations of the disclosed technology.

The disclosed technology will now be described using the detailed description in conjunction with the drawings and the attached claims.

DETAILED DESCRIPTION

Behavioral biometrics processing can be used to identify a user of a service by measuring user interactions with the device used to access the service and tying the user's behavior to previously learned behavior of that user. Device interactions such as keyboard interaction timing data can be used to increase the confidence that a correct user is authenticated for accessing privileged content, for detecting anomalous aspects involved with the use of a service, etc. A behavioral biometrics service can provide an enhanced layer of security based on a user's typing, timing, keystroke dwell, etc., for example, when the user interacts with a webpage of an enterprise (such as a business, service provider, governmental agency, etc.). Thus, the analysis of keystroke and/or keyflight dynamics may be utilized for verifying certain modalities of interactions with a user device. In certain implementations, behavioral biometrics can be seamless and/or non-disruptive and can be utilized to improve the user experience.

As an illustration of an example use case for which the disclosed technology may be utilized, consider a banking website or web app that includes a transaction page in which user may interact with and enter data in appropriate fields. The example transaction page may have many field names, such as "accountNumber," "toAccount," "toIBAN." etc., which can be named using HTML IDs or CSS tags, for example. When traditional behavioral biometrics processes are used on such a webpage, for example, to provide an extra layer of security, each field needs to be uniquely identified for the traditional behavioral models to build a sub-profile for each field for analysis. Thus, the "accountNumber" field may have a learned biometrics behavior stored in one sub-profile, while the "toAccount" may be associated with a different sub-profile, and so on. However, as discussed in the background section above, the field identifiers may be randomly generated, which can make it extremely difficult (if not impossible) to determine which key events came from specific fields, thereby severely reducing the effectiveness of the traditional behaviometric solutions.

In accordance with certain exemplary implementations of the disclosed technology, methods, and systems are provided for automatically generating unique identifiers and for text fields associated with online website interactions. Certain exemplary implementations may automatically determine a type of information (e.g., password, username, etc.,) associated with a text field. The generated identifiers and/or the determined type may be utilized to select and apply a correct behaviometrics algorithm to a particular text field to assess keystroke dynamics, for example, to provide authentication and/or to detect potentially fraudulent activity.

The disclosed technology may address situations where field identifiers change, are masked, and/or cannot be relied upon for the determination of the field type. Certain exemplary implementations of the disclosed technology may group text fields that have been given random identifiers, ensuring a behavioral biometrics backend can correctly profile keystrokes collected from the same text fields but from different user interactions.

Certain exemplary implementations of the disclosed technology may classify the kind of target text field on the fly without the need for unique references, which can ensure matching to the right profile automatically, independent from changes in the user interface. Furthermore, in certain implementations, the number of profiles can be reduced in cases where the same kind of information is used in several places. In certain implementations, the same profile may be applied instead of having multiple profiles for each of the information in the same fields.

The disclosed technology may enable the reduction of manual labor of setting up page definitions, improve cross-field grouping into correct types, enable the automatic use of appropriate behavioral algorithms, and/or reduce the number of models/profiles required to match the associated behaviometric data.

FIG. 1 is a simplified block diagram of an example system 100, in accordance with certain exemplary implementations of the disclosed technology. The system 100 can include a Behavioral Biometrics server 106 in communication with an Enterprise Server 104. In certain implementations, one or more of the Behavioral Biometrics server 106 and the Enterprise Server 104 may be in communication with the user device(s) 102. In certain implementations, the Behavioral Biometrics server 106 may include processing modules that may analyze user interactions via behaviometric data and/or metadata received either directly from the user devices 102, via the Enterprise Server 104, or both. In certain implementations, the processing of the behaviometric data and/or metadata may be independent of any framework or method used to create a user journey application.

Figure 2:
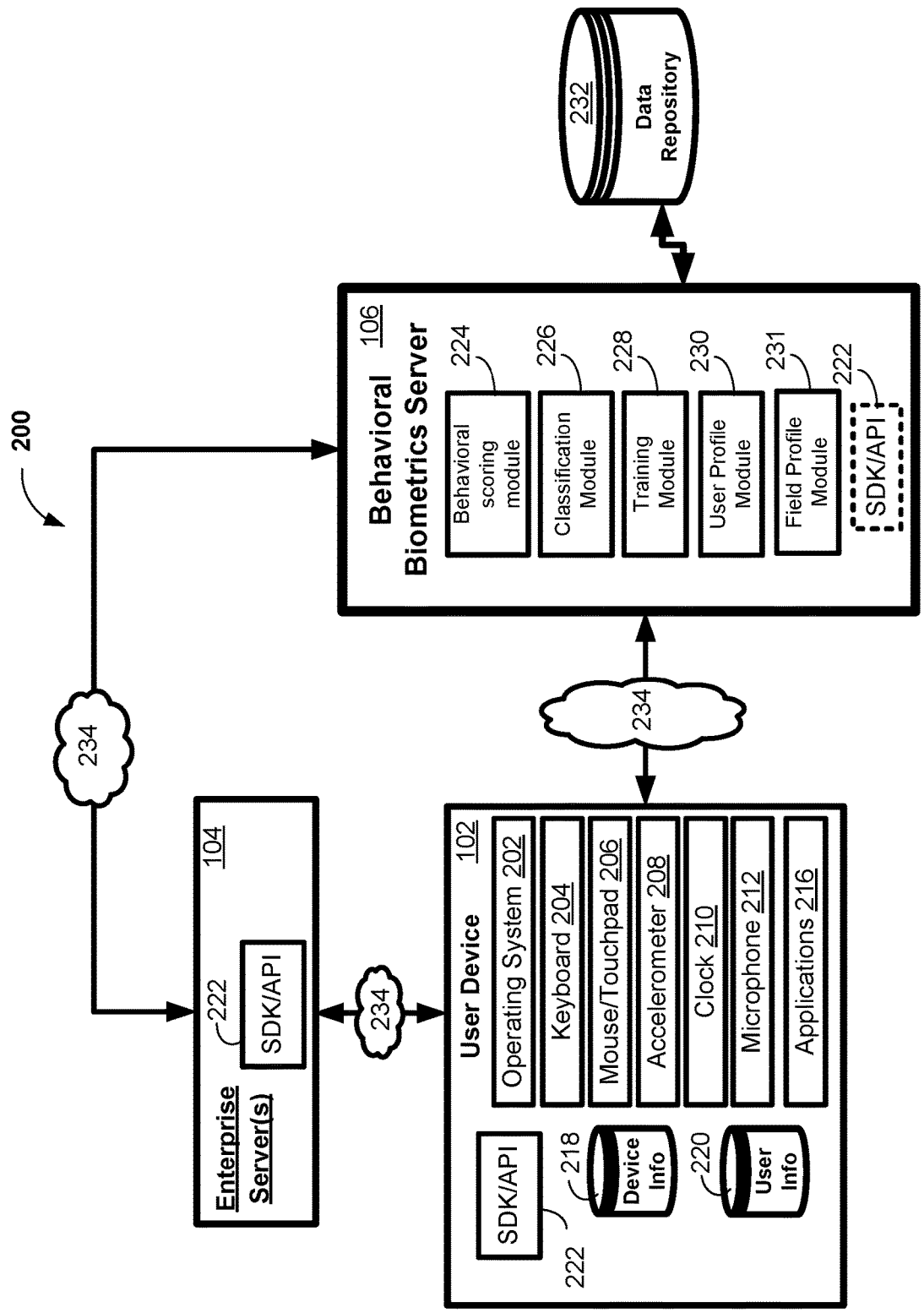
FIG. 2 is a detailed block diagram of an example system, in accordance with certain exemplary implementations of the disclosed technology.

FIG. 2 is a more detailed example block diagram of a system 200, in which certain components such as the user device 102, the Enterprise Server 104 and/or the Behavioral Biometrics server 106 may be embodied like the system 100 as discussed in FIG. 1. In certain exemplary implementations, the user device 102, the Enterprise Server 104, and/or the Behavioral Biometrics server 106 may be in communication with one another via communications channels 234 including, but not limited the Internet, local area network, cellular network, wide area network, etc.

In certain exemplary implementations, the user device 102 may include an operating system 202, a clock 210, applications 216, and one or more of a keyboard 204, mouse/touchpad 206, an accelerometer 208, and/or a microphone 212. Certain device info 218 may be stored in the memory of the client device 102. In certain exemplary implementations, user info 220 may be stored in the memory of the user's client device 102.

In accordance with certain exemplary implementations of the disclosed technology, a Javascript Software Development Kit (SDK)/Application Programming Interface (API) 222 may be utilized to collect behavioral biometrics data, JavaScript events, and/or metadata (such as properties and attributes) associated with text fields of a webpage for which a user (or a plurality of users) may interact with during an online journey (or online journeys), including but not limited to a login or authentication phase of the user online journey(s). A JavaScript SDK, for example, allows developers to build and maintain applications that interact with a JavaScript API. The SDK typically includes a set of tools and libraries that make it easier for developers to write code for interfacing with the API.

In accordance with certain exemplary implementations of the disclosed technology, the Behavioral Biometrics server 106 may include various modules, such as a behavioral scoring module 224, a classification module 226, a training module 228, a user profile module 230, and/or a field profile module 231 which may be used to enable the various methods and functions of the Behavioral Biometrics server 106.

Certain exemplary implementations of the Behavioral Biometrics server 106 may be in communication with a data repository 232, for example, which may be used to store user, device, and/or previous behavioral data, and which can be updated and retrieved for comparisons against current behavioral data. In certain implementations, the data repository 232 may retrieve device info 218 and/or user info 220 from the user device 102 via the Enterprise server 104 and/or Behavioral Biometrics server 106 to update the data repository 232. In certain implementations, the user profile module 230 and/or the field profile module 231 may be used for retrieving, comparing, and updating user and/or text field profile information stored in the data repository 232.

Certain implementations of the disclosed technology may be viewed as having a training phase, which may utilize the training module 228, and a classification phase, which may utilize the classification module 226. In the training phase, for example, feature vectors describing text fields may be extracted from received data and metadata of the SDK/API 222-monitored webpage served by the Enterprise Server 104. In accordance with certain exemplary implementations of the disclosed technology, the feature vectors may be derived from multiple users of the website. In certain exemplary implementations, the training may run once or continuously, for example, to handle changes in the user journey via the user interface of the webpage or application.

In the training phase, the feature vectors may be fed into one or several clustering algorithms to achieve a partitioning of data such that data having a high feature similarity are placed in the same group. By the choice of feature vectors, the data describing the text field may be categorized into functional groups having the same or highly similar properties. For example, text fields with certain labels or tags such as "accountNumber", "toAccount", "toIBAN" etc., may be placed into distinct categories exhibiting high similarity, as defined by the statistical distance metric. In this example, even though the name tags differ, the features or data types associated with such text fields may be the same, and thus, these text fields may be categorized in the same functional group.

In certain exemplary implementations, aspects/features of the feature vectors associated with (or representing) a text field may include a text field size, a relative position, coordinates, field ordering, pre-filled letters, parent and children HTML tags, etc. In accordance with certain exemplary implementations of the disclosed technology, the statistical distance metric from the particular aspect/feature to the centroid of the functional groups may be computed. In the training phase, the centroids may be continuously adjusted to map to a predetermined or automatically determined number of groups.

In certain exemplary implementations, the aspects/features may be selected across multiple users such that they are not dependent on a particular device, user, or agent. In certain implementations, the aspects/features can be adjusted for scaling and normalization on the client side.

With reference to FIG. 2, and in accordance with certain exemplary implementations of the disclosed technology, when new user data is to be evaluated, i.e., during a classification phase, the classification module 226 may classify feature vectors of new incoming text field data by comparing them, using the same statistical distance metric, to the created centroids of the functional groups. Once the functional group for data from a text field is established, for example, using the behavioral scoring module 224, correct behavioral algorithms may be automatically chosen and applied to the new incoming text to match against an existing field profile and/or user profile (or profiles of a plurality of users). In certain exemplary implementations, if the text field identifier (ID) is stable during a time window, such as between deployment of different builds of the site frontend, a random ID can be used as a label during the time window.

Figure 3:
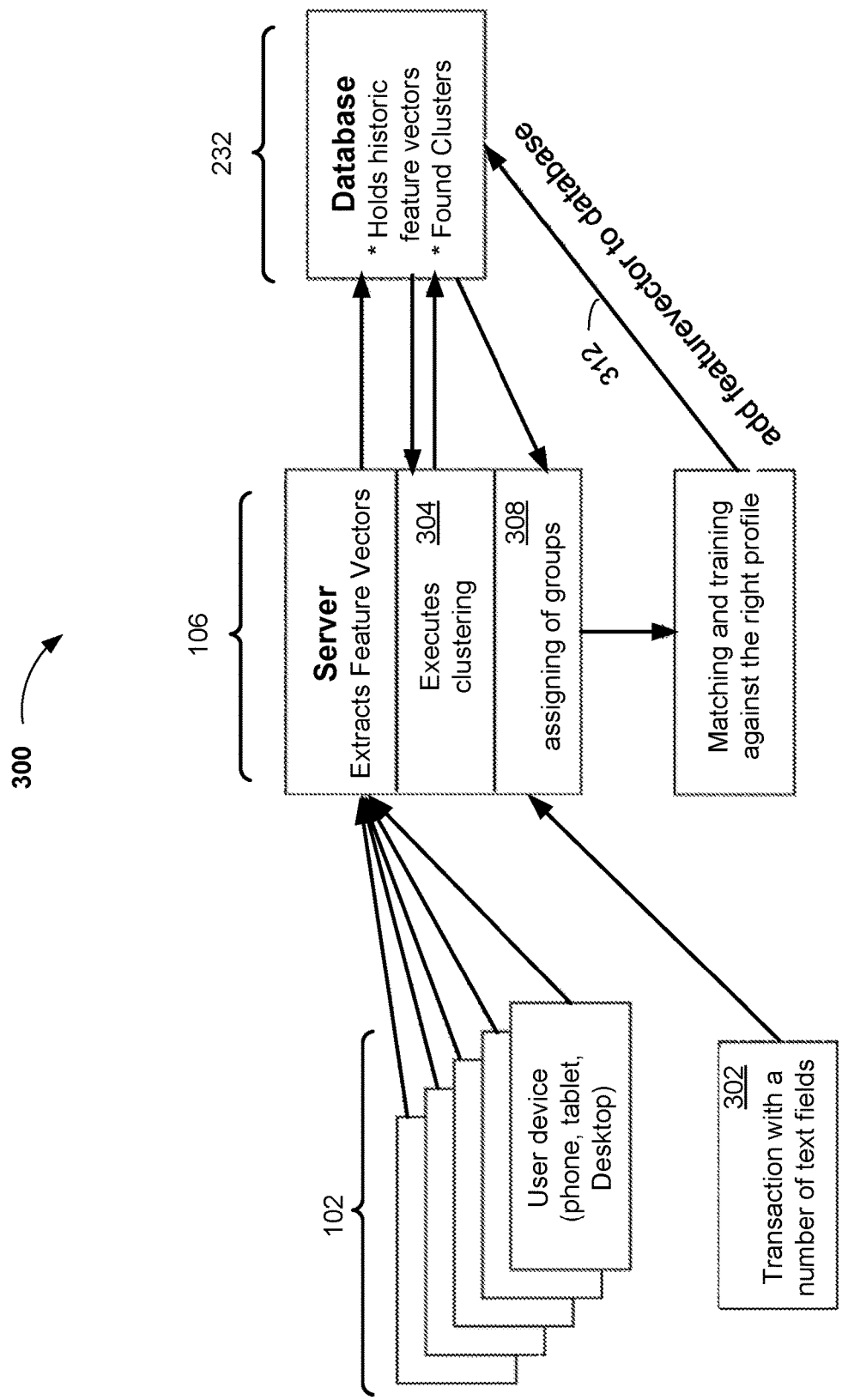
FIG. 3 is a block diagram of an example process, in accordance with certain exemplary implementations of the disclosed technology.

FIG. 3 is a block diagram of an example process 300, in accordance with certain exemplary implementations of the disclosed technology. The blocks and functions of this example process 300 may be carried out using one or more of the user device 102, the Enterprise server 104, and/or the Behaviometric Biometrics server 106 as discussed above with respect to FIG. 2.

In accordance with certain exemplary implementations, one or more steps or sequences associated with the process 300 may be utilized to extract and use feature vectors from the user device 102 interactions in one or more of a training phase and a classification phase. For example, as shown in block 302, an interaction with webpage (for example, via the Enterprise server 104) by the user device 102 may involve entering information into text fields during a transaction. Accordingly, text field data and metadata may be collected (using the SDK/API 222) from user device(s) 102 and sent to the Behavioral Biometrics server 106 and may be stored in the database 232. The Behavioral Biometrics server 106 may construct a dataset using the information about the text fields, for example, by constructing feature vectors that target and capture data type separation having similar contextual patterns.

In accordance with certain exemplary implementations of the disclosed technology, a clustering algorithm 304 may be applied to the dataset to create centroids for each distinct contextual pattern for identification of functional groups 308. Based on the emergent functional groups from the clustering, text fields can be labeled with names. In certain implementations, the data repository 232 may include a database that may store historic feature vectors and determined clusters. In certain implementations, as features/vectors are matched to a field profile and/or user profile, the features/vectors may be added 312 to the database for easy retrieval and use.

In a training phase, and in accordance with certain exemplary implementations of the disclosed technology, feature vectors describing typed text may be extracted from received text data from multiple users using behavioral biometrics algorithms. For example, behavioral biometrics algorithms may evaluate keypress times, key flight times, key rollover times, durations spent waiting, typing, and navigating, control keys used, etc., as discussed in U.S. Pat. No. 10,068,088 and incorporated herein by reference as if presented in full. For each functional group, a machine learning model may be trained against a text field profile and/or a user profile.

In a classification phase, text fields may be classified as belonging to the functional group with which it has the smallest statistical distance. In the case where no label was assigned (such as inconclusive field data, or when feature vectors are too similar to multiple functional groups) the text field data may be stored as an outlier and given a label for use later on when enough close data points are collected to form a cluster with the outlier sessions. During the classification phase, matching may be conducted to classify the feature vector to the correct text field profile and/or user profile.

In certain implementations, ongoing training and classification can be conducted. For example, a determination of the type of the incoming data and the corresponding text field profile may be used to match the data/feature vector against the right data model and the data/feature vector may be matched and trained into the correct profile.

In accordance with certain exemplary implementations of the disclosed technology, the feature vectors may be fed into one or several clustering algorithms to achieve a partitioning of data such that data having a high feature similarity are placed in the same group. By the choice of feature vectors, the underlying data may be categorized into functional groups having the same data type. For example, phone numbers, names, account numbers, etc., may be placed into distinct categories exhibiting high similarity when the type of data entered is the same. Example aspects/features of the feature vectors may include (but are not limited to) a proportion of numbers to characters, chunks and gaps of typed keystroke sequences (e.g. typing-pause-typing for one-time passwords), the proportion of keystrokes to the total number of characters in the field, frequency of keystrokes over time or the proportion of control characters, such as corrections/space to identify the kind of information.

In certain implementations, an account number may contain many more numbers than a name field, and comparing the proportion of numbers to characters in the field may provide an indication of what information the field is supposed to contain. Free text or messages may more frequently involve control keys for the purpose of editing the text. Punctuation and spelling mistakes, etc., may result in a certain pattern of observed keystrokes. Since the fluency of a user's typing can depend on the amount of cognitive work required and/or the length of the character sequence, certain implementations of the disclosed technology may utilize time gaps as indicators for differentiating information that is memorized (like phone numbers) from unknown information (like a one-time password or account number, which likely is typed in chunks).

Figure 4:
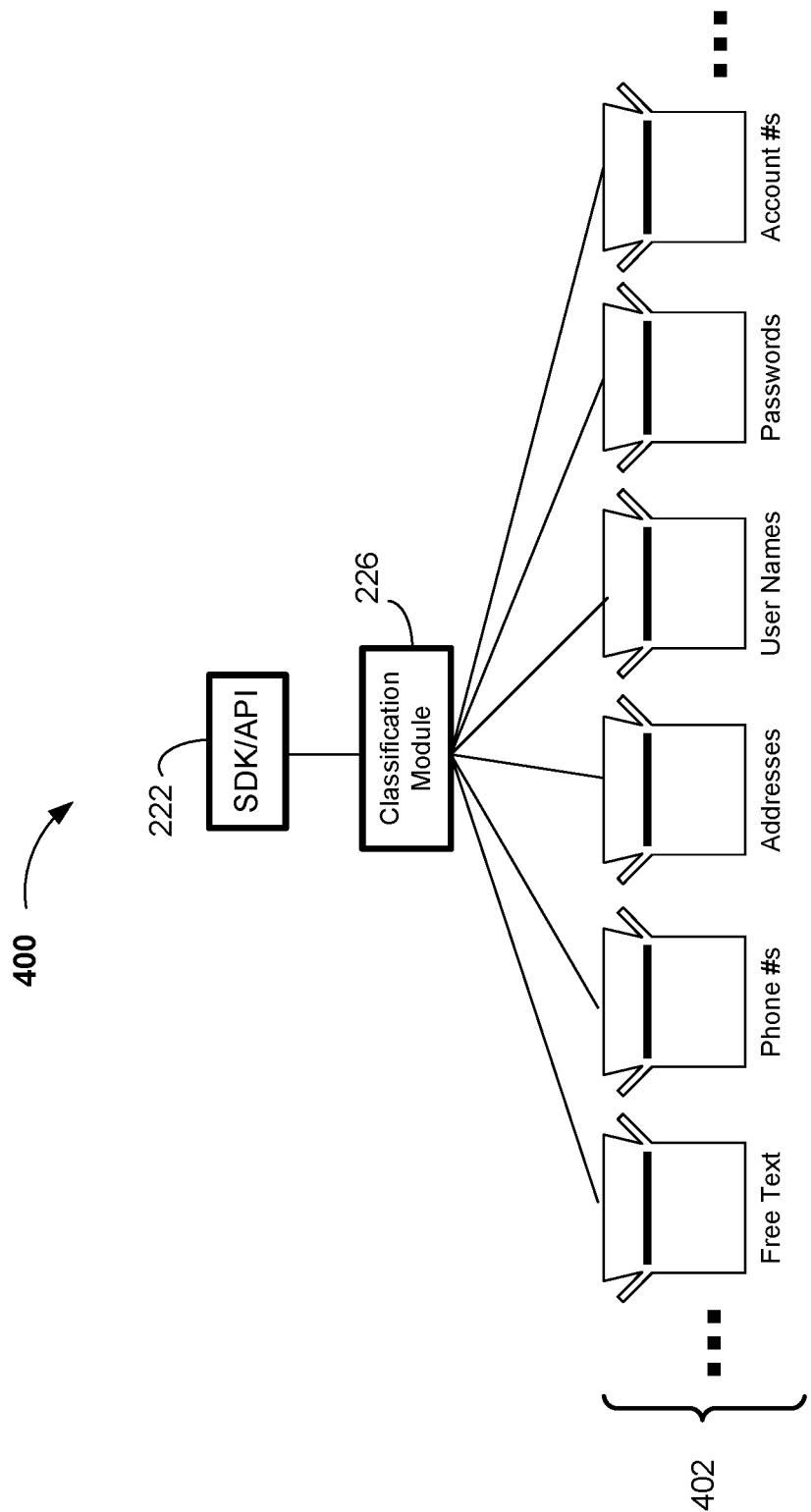
FIG. 4 is an example illustration of field type bucketing, in accordance with certain implementations of the disclosed technology.

FIG. 4 is an example illustration of field-type bucketing, in accordance with certain implementations of the disclosed technology. In accordance with certain exemplary implementations of the disclosed technology, different types of data may be bucketed into functional groups 402 that can include free text, telephone numbers, addresses, email addresses, usernames, passwords, account numbers etc. In certain implementations, the aspects/features may be actively selected to not capture user-specific behavior, which is the typical modus operandi of normal behavioral biometrics. When new user/field data is gathered (for example, by the SDK/API 222) to be evaluated, i.e., during the classification phase, a model (for example, associated with the classification module 226) may be utilized to classify new incoming field data feature vector(s) by comparing them to the created centroids of the functional groups. Once the functional group for data from a field is established, the correct behavioral algorithms may be automatically chosen to match against the existing profile(s).

FIG. 5 is an example illustration of HTML code 500 in which random field names may be utilized, as indicated by the dark dashes. In this example illustration, certain HTML tags that encode the elements into the page are still available and can be extracted and used as part of the feature vector for training the classifier to correctly model the target IDs, in accordance with certain exemplary implementations of the disclosed technology.

The analysis tools and techniques utilized herein can include but are not limited to clustering algorithms, for example, as discussed in Xu, D., Tian, Y. "A Comprehensive Survey of Clustering Algorithms. Ann. Data. Sci. 2, 165-193 (2015), the contents of which are incorporated herein by reference as if presented in full.

Clustering analysis, for example, may be utilized to determine similarity, dissimilarity, and/or proximity, according to certain standards or rules. Certain implementations may utilize supervised classification to map input data (for example, Δt or spatial distance) to a finite set of discrete class labels (such as discrete timing clusters or discrete levels). Certain exemplary implementations of the disclosed technology may utilize unsupervised classification or exploratory data analysis, for example, to determine natural or "hidden" data structures rather than relying on predefined classifications. In accordance with certain exemplary implementations of the disclosed technology, clustering algorithms may be utilized to partition the user interaction data into a certain number of clusters (groups, subsets, or categories, such as illustrated in FIG. 4) that may provide various indications as to the nature of the field or transaction, including but not limited to, whether or not a remote access tool is being utilized, whether the interaction matches with historical patterns of fraud, etc.

Various classification processes may be utilized herein to assign one or more user interaction data events to a predefined class in a group. Certain implementations may employ classification when the user interaction data has already been divided into groups, such as perturbed and non-perturbed. Certain implementations may utilize preprocessing of the user interaction data, which can include data cleaning (missing values, null values, blank values), data integration from multiple sources, data transformation, and/or discretization. Certain implementations of the disclosed technology may utilize classification algorithms including but not limited to decision tree algorithms, naïve Bayes algorithms, rule-based classification, optimal hyperplane algorithms, and genetic algorithms.

The analysis tools and techniques utilized herein can include, but are not limited to classification algorithms, for example, as discussed in Mishra et al, Syscom-2021, "A Survey on Data mining classification approaches." (2021), the contents of which are incorporated herein by reference as if presented in full.

The analysis tools and techniques utilized herein can include distance distribution analysis, for example, as discussed in Yang, Liu "Distance Metric Learning: A Comprehensive Survey," (2006), the contents of which are incorporated herein by reference as if presented in full.

Certain distance metric learning algorithms may be utilized and/or combined with other analysis techniques (such as K-nearest-neighbor (KNN)). Certain exemplary implementations of the disclosed technology may utilize supervised distance metric learning. Certain exemplary implementations of the disclosed technology may utilize unsupervised distance metric learning. Certain exemplary implementations of the disclosed technology may utilize various forms of global and/or local distance metric learning, such as linear discriminative analysis, adaptive feature relevance analysis, adaptive kernel metric nearest neighbor classification, etc.

Figure 6:
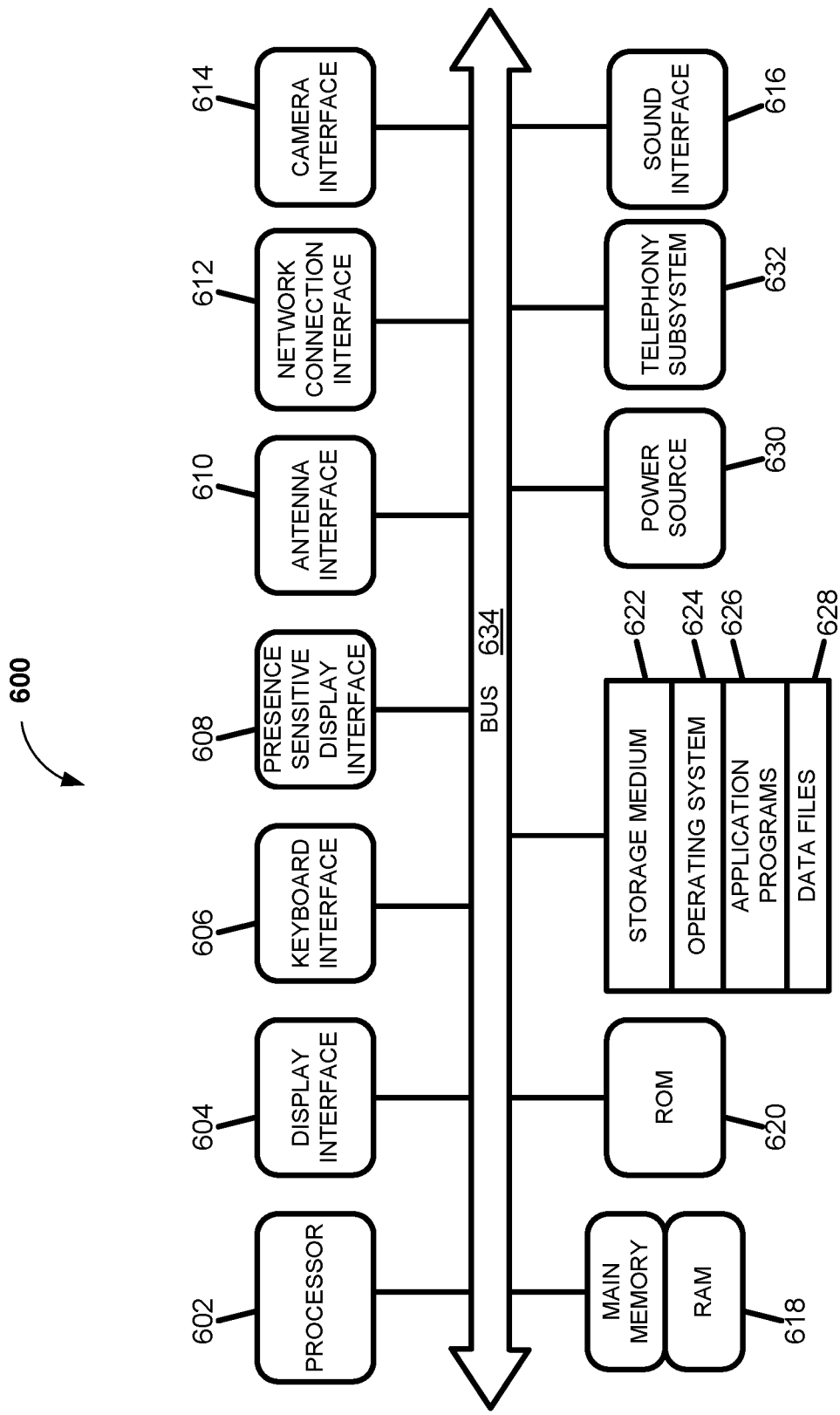
FIG. 6 is a block diagram of an example processor, in accordance with certain exemplary implementations of the disclosed technology.

FIG. 6 illustrates an example computing device 600, in accordance with certain exemplary implementations of the disclosed technology. Various implementations and methods herein may be embodied in non-transitory computer-readable media for execution by a processor. It will be understood that the computing device 600 is provided for example purposes only and does not limit the scope of the various implementations of the communication systems and methods.

The computing device 600 of FIG. 6 includes one or more processors where computer instructions are processed. The computing device 600 may comprise the processor 602, or it may be combined with one or more additional components shown in FIG. 6. In some instances, a computing device may be a processor, controller, or central processing unit (CPU). In yet other instances, a computing device may be a set of hardware components.

The computing device 600 may include a display interface 604 that acts as a communication interface and provides functions for rendering video, graphics, images, and texts on the display. In certain example implementations of the disclosed technology, the display interface 604 may be directly connected to a local display. In another example implementation, the display interface 604 may be configured for providing data, images, and other information for an external/remote display. In certain example implementations, the display interface 604 may wirelessly communicate, for example, via a Wi-Fi channel or other available network connection interface 612 to the external/remote display.

In an example implementation, the network connection interface 612 may be configured as a communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high-definition multimedia (HDMI) port, a video port, an audio port, a Bluetooth port, a near-field communication (NFC) port, another like communication interface, or any combination thereof. In one example, the display interface 604 may be operatively coupled to a local display. In another example, the display interface 604 may wirelessly communicate, for example, via the network connection interface 612 such as a Wi-Fi transceiver to the external/remote display.

The computing device 600 may include a keyboard interface 606 that provides a communication interface to a keyboard. According to certain example implementations of the disclosed technology, the presence-sensitive display interface 608 may provide a communication interface to various devices such as a pointing device, a touch screen, etc.

The computing device 600 may be configured to use an input device via one or more of the input/output interfaces (for example, the keyboard interface 606, the display interface 604, the presence-sensitive display interface 608, the network connection interface 612, camera interface 614, sound interface 616, etc.,) to allow a user to capture information into the computing device 600. The input device may include a mouse, a trackball, a directional pad, a trackpad, a touch-verified trackpad, a presence-sensitive trackpad, a presence-sensitive display, a scroll wheel, a digital camera, a digital video camera, a web camera, a microphone, a sensor, a smartcard, and the like. Additionally, the input device may be integrated with the computing device 600 or may be a separate device. For example, the input device may be an accelerometer, a magnetometer, a digital camera, a microphone, and an optical sensor.

Example implementations of the computing device 600 may include an antenna interface 610 that provides a communication interface to an antenna; a network connection interface 612 that provides a communication interface to a network. According to certain example implementations, the antenna interface 610 may utilize to communicate with a Bluetooth transceiver.

In certain implementations, a camera interface 614 may be provided that acts as a communication interface and provides functions for capturing digital images from a camera. In certain implementations, a sound interface 616 is provided as a communication interface for converting sound into electrical signals using a microphone and for converting electrical signals into sound using a speaker. According to example implementations, random-access memory (RAM) 618 is provided, where computer instructions and data may be stored in a volatile memory device for processing by the CPU 602.

According to an example implementation, the computing device 600 includes a read-only memory (ROM) 620 where invariant low-level system code or data for basic system functions such as basic input and output (I/O), startup, or reception of keystrokes from a keyboard are stored in a non-volatile memory device. According to an example implementation, the computing device 600 includes a storage medium 622 or other suitable types of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 624, application programs 626 (including, for example, a web browser application, a widget or gadget engine, and or other applications, as necessary) and data files 628 are stored. According to an example implementation, the computing device 600 includes a power source 630 that provides an appropriate alternating current (AC) or direct current (DC) to power components. According to an example implementation, the computing device 600 includes a telephony subsystem 632 that allows the device 600 to transmit and receive sound over a telephone network. The constituent devices and the CPU 602 communicate with each other over a bus 634.

In accordance with an example implementation, the CPU 602 has an appropriate structure to be a computer processor. In one arrangement, the computer CPU 602 may include more than one processing unit. The RAM 618 interfaces with the computer bus 634 to provide quick RAM storage to the CPU 602 during the execution of software programs such as the operating system application programs, and device drivers. More specifically, the CPU 602 loads computer-executable process steps from the storage medium 622 or other media into a field of the RAM 618 to execute software programs. Data may be stored in the RAM 618, where the data may be accessed by the computer CPU 602 during execution. In one example configuration, the device 600 includes at least 128 MB of RAM, and 256 MB of flash memory.

The storage medium 622 itself may include a number of physical drive units, such as a redundant array of independent disks (RAID), a floppy disk drive, a flash memory, a USB flash drive, an external hard disk drive, a thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer-readable storage media allow the device 600 to access computer-executable process steps, application programs, and the like, stored on removable and non-removable memory media, to off-load data from the device 600 or to upload data onto the device 600. A computer program product, such as one utilizing a communication system may be tangibly embodied in storage medium 622, which may comprise a machine-readable storage medium.

According to one example implementation, the term computing device, as used herein, may be a CPU, or conceptualized as a CPU (for example, the CPU 602 of FIG. 6). In this example implementation, the computing device (CPU) may be coupled, connected, and/or in communication with one or more peripheral devices. It should also be understood by one skilled in the art that the devices depicted in FIG. 1 and/or FIG. 2 may be implemented on a computing device 600 such as is shown in FIG. 6.

Figure 7:
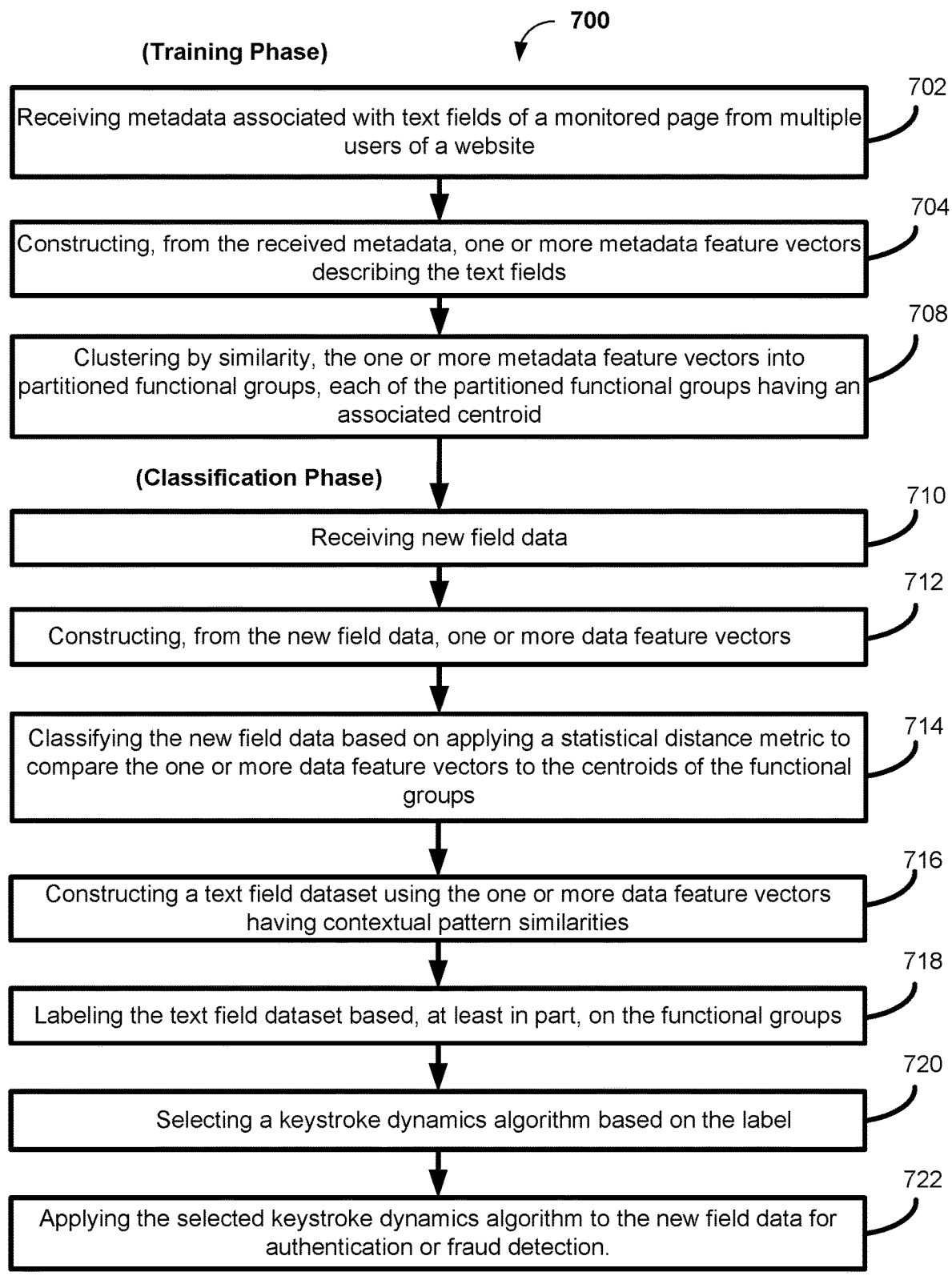
FIG. 7 is a flow diagram of an example method, in accordance with certain exemplary implementations of the disclosed technology.

FIG. 7 is a flow diagram of an example method 700 for automatically generating unique identifiers for text fields associated with online website interactions, in accordance with certain exemplary implementations of the disclosed technology. The method 700 can include a training phase (as indicated by blocks 702-708) and/or a classification phase (as indicated by blocks 710-722). In block 702, the method 700 can include receiving metadata associated with text fields of a monitored page from multiple users of a website. In block 704, the method 700 can include constructing, from the received metadata, one or more metadata feature vectors describing the text fields. In block 706, the method 700 can include clustering by similarity, the one or more metadata feature vectors into partitioned functional groups, each of the partitioned functional groups having an associated centroid. In block 710, the method 700 can include receiving new field data. In block 712, the method 700 can include constructing, from the new field data, one or more data feature vectors. In block 714, the method 700 can include classifying the new field data based on applying a statistical distance metric to compare the one or more data feature vectors to the centroids of the functional groups. In block 716, the method 700 can include constructing a text field dataset using the one or more data feature vectors having contextual pattern similarities. In block 718, the method 700 can include labeling the text field dataset based, at least in part, on the functional groups. In block 720, the method 700 can include selecting a keystroke dynamics algorithm based on the label. In block 722, the method 700 can include applying the selected keystroke dynamics algorithm to the new field data for authentication or fraud detection.

Certain implementations of the disclosed technology may further include matching the classified new field data to one or more existing user profiles, wherein selecting a keystroke dynamics algorithm is based on the matching.

In certain implementations, the metadata can include one or more of a unique identifier, a randomly generated unique identifier, an HTML identifier, a CSS tag, a static text field identifier, behavioral biometrics data, JavaScript events, and metadata around text fields in a JavaScript SDK.

In certain implementations, one or more metadata feature vectors can include one or more of text field size, relative position, coordinates, field ordering, pre-filled letters, one or more parent HTML tags, and one or more children HTML tags.

Certain implementations of the disclosed technology may further include storing inconsequential field data as outliers for subsequent labeling.

In certain implementations, the statistical distance metric may be configured to determine a similarity measure between the data feature vectors and the centroids of the functional groups. In certain implementations, centroids may be adjusted to map to a predetermined or automatically determined number of groups.

In accordance with certain exemplary implementations of the disclosed technology, a text field ID may be used for labeling a field of the text field dataset when the text field ID remains unchanged among different builds and associated deployments of a frontend of the website.

Figure 8:
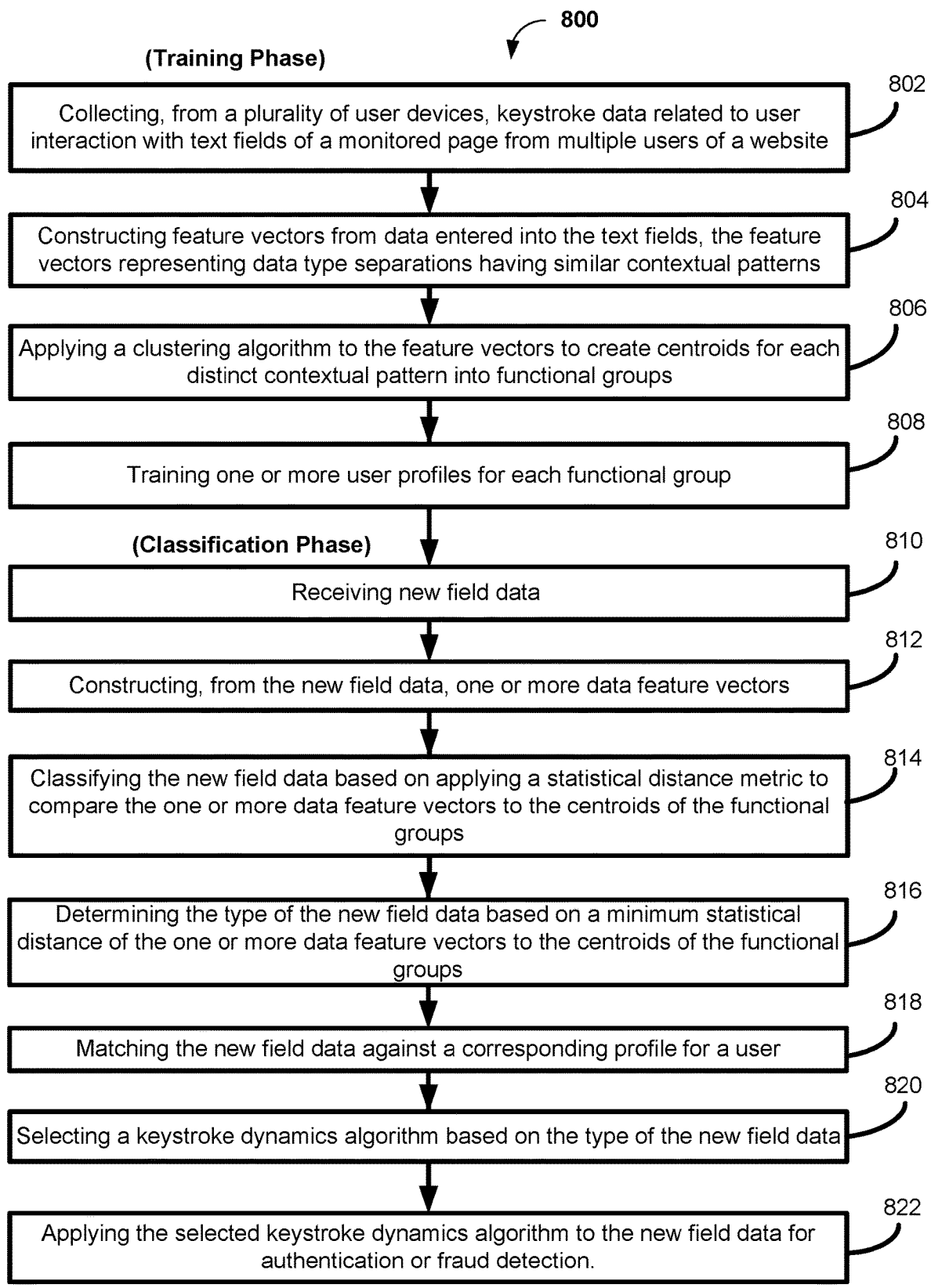
FIG. 8 is a flow diagram of an example method, in accordance with certain exemplary implementations of the disclosed technology.

FIG. 8 is a flow diagram of an example method 800 for automatic determination of a type of information in a text field associated with online website interactions, in accordance with certain exemplary implementations of the disclosed technology. The method 800 can include a training phase (as indicated by blocks 802-808) and/or a classification phase (as indicated by blocks 810-822). In block 802, the method 800 can include collecting, from a plurality of user devices, keystroke data related to user interaction with text fields of a monitored page from multiple users of a website. In block 804, the method 800 can include constructing feature vectors from data entered into the text fields, the feature vectors representing data type separations having similar contextual patterns. In block 806, the method 800 can include applying a clustering algorithm to the feature vectors to create centroids for each distinct contextual pattern into functional groups. In block 808, the method 800 can include training one or more user profiles for each functional group. In block 810, the method 800 can include receiving new field data. In block 812, the method 800 can include constructing, from the new field data, one or more data feature vectors. In block 814, the method 800 can include classifying the new field data based on applying a statistical distance metric to compare the one or more data feature vectors to the centroids of the functional groups. In block 816, the method 800 can include determining the type of the new field data based on a minimum statistical distance of the one or more data feature vectors to the centroids of the functional groups. In block 818, the method 800 can include matching the new field data against a corresponding profile for a user. In block 820, the method 800 can include selecting a keystroke dynamics algorithm based on the type of the new field data. In block 822, the method 800 can include applying the selected keystroke dynamics algorithm to the new field data for authentication or fraud detection.

In accordance with certain exemplary implementations of the disclosed technology, feature vectors may be constructed from collected text data using one or more behavioral biometrics algorithms. In certain implementations, the feature vectors can represent one or more of keypress times, key flight times, key rollover times, durations spent waiting, typing and navigating, and control keys used in entering text.

In certain implementations, applying the clustering algorithm may further partition the feature vectors such that the data entered into the text fields having feature similarity above a threshold are placed in same functional group.

In accordance with certain exemplary implementations of the disclosed technology, the feature vectors can include a proportion of numbers to characters, chunks and gaps of typed keystroke sequences, a proportion of keystrokes to total number of characters in the field, frequency of keystrokes over time, and/or a proportion of control characters to identify a kind of information.

In certain implementations, the functional groups can include free text, telephone numbers, addresses, email addresses, usernames, and passwords.

In certain implementations, the feature vectors may be actively selected to not capture user-specific behavior.

In certain implementations, the profiles may be trained based on functional groups from the clustering.

In certain exemplary implementations, the user journeys may be classified in a pre-deployment analysis phase.

In certain exemplary implementations, a behaviometric algorithm may be selected according to a particular segment of the user journey.

In certain exemplary implementations, events related to user interactions with the pages (such as typing, scrolling, swiping, submitting, etc.,) may be stored as fixed length time series.

In certain exemplary implementations, the adaptation of the algorithms may be facilitated by the detection and matching of one or more events and/or processes relating to navigating or interacting with different web pages that are common for users performing user journeys. In certain exemplary implementations, an existing pre-trained template may be utilized to define steps taken in the user journeys.

Figure 9:
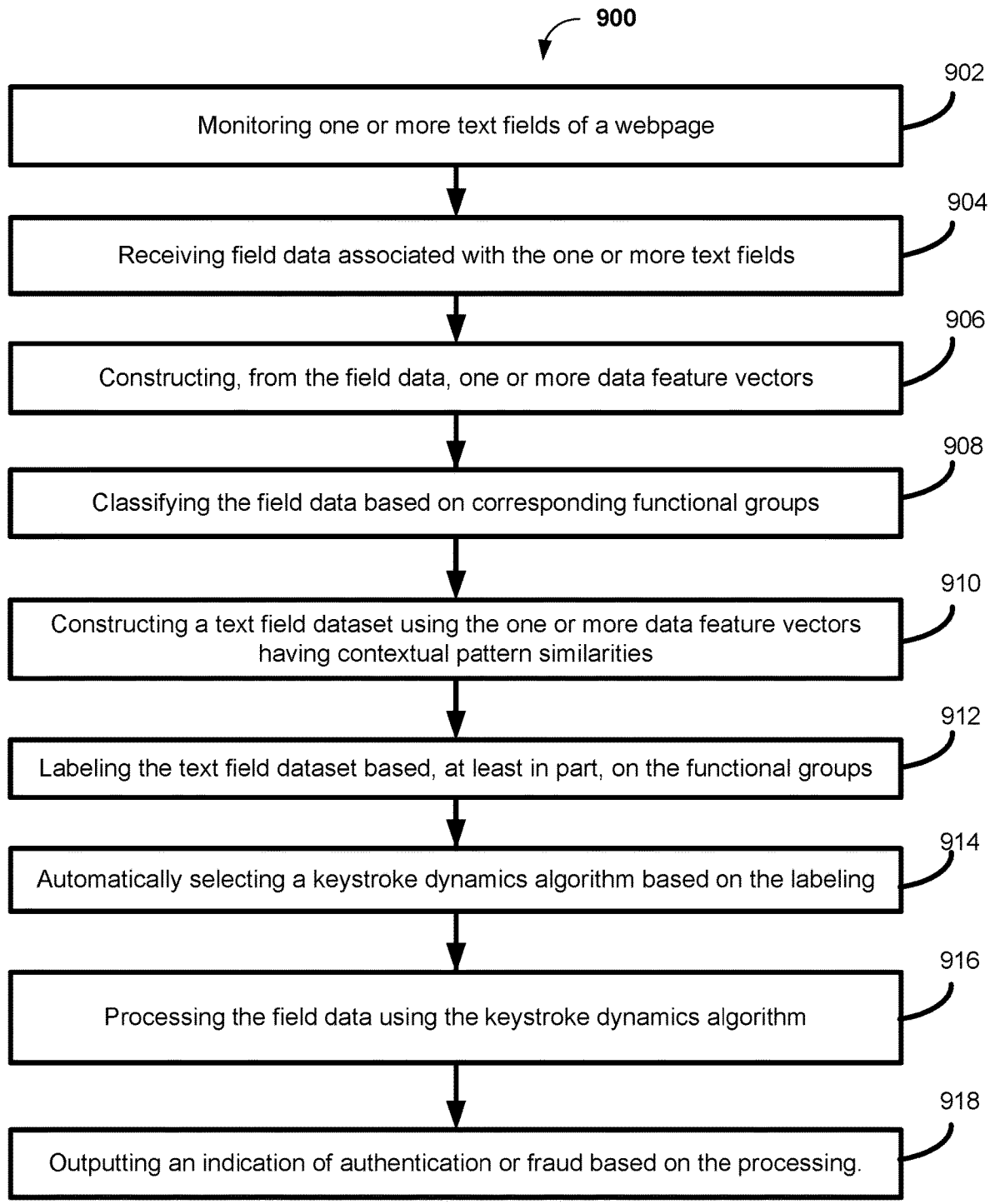
FIG. 9 is a flow diagram of an example method, in accordance with certain exemplary implementations of the disclosed technology.

FIG. 9 is a flow diagram of an example method 900 for automatically generating unique identifiers for text fields associated with online website interactions, in accordance with certain exemplary implementations of the disclosed technology. In block 902, the method 900 can include monitoring one or more text fields of a webpage. In block 904, the method 900 can include receiving field data associated with the one or more text fields. In block 906, the method 900 can include constructing, from the field data, one or more data feature vectors. In block 908, the method 900 can include classifying the field data based on corresponding functional groups. In block 910, the method 900 can include constructing a text field dataset using the one or more data feature vectors having contextual pattern similarities. In block 912, the method 900 can include labeling the text field dataset based, at least in part, on the functional groups. In block 914, the method 900 can include automatically selecting a keystroke dynamics algorithm based on the labeling. In block 916, the method 900 can include processing the field data using the keystroke dynamics algorithm. In block 918, the method 900 can include outputting an indication of authentication or fraud based on the processing.

Certain implementations of the disclosed technology can include receiving metadata associated with the one or more text fields. Certain implementations of the disclosed technology can include constructing, from the metadata, one or more metadata feature vectors describing the text fields. Certain implementations of the disclosed technology can include clustering by similarity, the one or more metadata feature vectors into the functional groups, each of the functional groups having an associated centroid, wherein classifying the field data is based on applying a statistical distance metric to compare the one or more data feature vectors to centroids of corresponding functional groups.

In certain implementations, the metadata may be associated with multiple users of the website.

In accordance with certain exemplary implementations of the disclosed technology, the monitoring may be performed using one or more of a Software Development Kit (SDK) and an Application Programming Interface (API) to collect one or more of behavioral biometrics data, JavaScript events, and metadata associated with text fields of the webpage.

Certain implementations of the disclosed technology can include matching classified field data to one or more existing user profiles, wherein automatically selecting the keystroke dynamics algorithm is further based on the matching.

Figure 10:
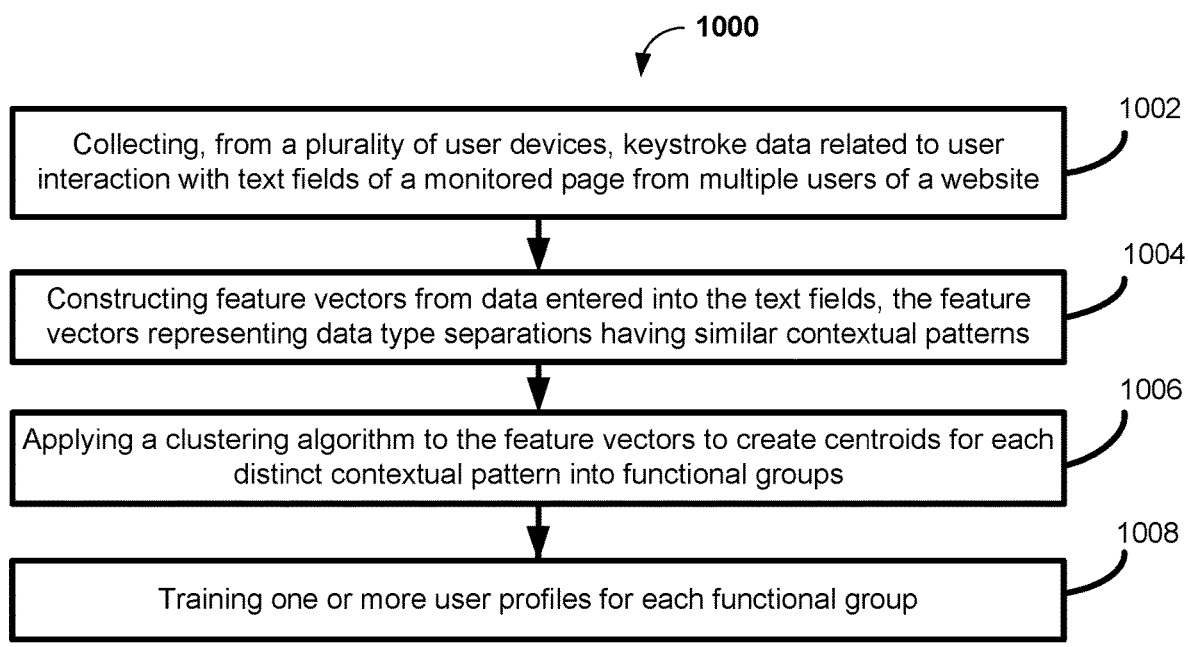
FIG. 10 is a flow diagram of an example method, in accordance with certain exemplary implementations of the disclosed technology.

FIG. 10 is a flow diagram of an example method 1000 for automatic determination of a type of information in a text field associated with online website interactions, in accordance with certain exemplary implementations of the disclosed technology. In block 1002, the method 1000 can include collecting, from a plurality of user devices, keystroke data related to user interaction with text fields of a monitored page from multiple users of a website. In block 1004, the method 1000 can include constructing feature vectors from data entered into the text fields, the feature vectors representing data type separations having similar contextual patterns. In block 1006, the method 1000 can include clustering algorithm the feature vectors to create centroids for each distinct contextual pattern into functional groups. In block 1008, the method 1000 can include training one or more user profiles for each functional group.

Certain implementations of the disclosed technology can include one or more of: receiving new field data; constructing, from the new field data, one or more data feature vectors; classifying the new field data based on applying a statistical distance metric to compare the one or more data feature vectors to the centroids of the functional groups; determining the type of the new field data based on a minimum statistical distance of the one or more data feature vectors to the centroids of the functional groups; matching the new field data against a corresponding profile for a user; selecting a keystroke dynamics algorithm based on the type of the new field data; and/or applying the selected keystroke dynamics algorithm to the new field data for authentication or fraud detection.

In some implementations, the feature vectors may be constructed from collected text data using one or more behavioral biometrics algorithms. In certain implementations, the feature vectors can represent one or more of keypress times, key flight times, key rollover times, durations spent waiting, typing and navigating, and/or control keys used in entering text.

In certain implementations, clustering may include applying a clustering algorithm and partitioning the feature vectors such that the data entered into the text fields having feature similarity above a threshold are placed in same functional group.

In certain implementations, the feature vectors can include a proportion of numbers to characters, chunks and gaps of typed keystroke sequences, a proportion of keystrokes to total number of characters in the field, frequency of keystrokes over time, and/or a proportion of control characters to identify a kind of information.

In certain implementations, the functional groups can include free text, telephone numbers, addresses, email addresses, usernames, passwords, etc.

In certain implementations, the profiles may be trained based on functional groups from the clustering.

As used herein, the terms "data," "content," "information," and similar terms may be used interchangeably to refer to data capable of being transmitted, received, and/or stored in accordance with the disclosed technology. Thus, the use of any such terms should not be taken to limit the spirit and scope of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

As used herein, the terms "user" may be used to refer, without limitation, to a human, client, customer, purchaser, shopper, user, and the like who may be using any number of client devices and/or online identities to receive and interact with networked digital content.

Methods, apparatuses, and computer program products of the disclosed technology may be embodied by any of a variety of devices. For example, the method, apparatus, and computer program product of an example embodiment may be embodied by a networked device, such as a server or other network entity, configured to communicate with one or more devices, such as one or more client devices. Additionally, or alternatively, the computing device may include fixed computing devices, such as a personal computer or a computer workstation. Still, further, example embodiments may be embodied by any of a variety of mobile devices, such as a portable digital assistant (PDA), mobile telephone, smartphone, laptop computer, tablet computer, wearable, or any combination of the aforementioned devices.

As will be appreciated, any such computer program instructions and/or another type of code may be loaded onto a computer, processor, or other programmable apparatus's circuitry to produce a machine, such that the computer, processor or other programmable circuitry that executes the code on the machine creates the means for implementing various functions, including those described herein.

It is also noted that all or some of the information presented by the example displays discussed herein can be based on data that is received, generated, and/or maintained by one or more components of apparatuses herein. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the subject matter and the operations described herein can be implemented in digital electronic circuitry, computer software, firmware, or hardware, including the structures, disclosed in this specification and their structural equivalents, or combinations of one or more of them. Embodiments of the subject matter described herein can be implemented as one or more computer programs, i.e., one or more modules of computer program instructions encoded on the computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The terms "user device," "computing devices," and "mobile computing devices" encompass all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or another unit suitable for use in a computing environment. A computer program may but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flow described herein can be performed by one or more programmable processors executing one or more computer programs to perform actions by operating on input information/data and generating output. Processors suitable for the execution of a computer program include, by way of example, both general and special purpose microprocessors, and one or more processors of any kind of digital computer. Generally, a processor will receive instructions and information/data from a read-only memory or a random-access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard/touchscreen and/or a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship with each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

As utilized herein, the term "or" is used herein in both the alternative and conjunctive sense, unless otherwise indicated. The terms "illustrative" and "exemplary" are used to be examples with no indication of quality level. Like numbers refer to like elements throughout.

While this specification contains many specific implementation details, these should not be construed as limitations on the scope of any disclosures or of what may be claimed, but rather as descriptions of features specific to embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated with a single software product or packaged into multiple software products.

Thus, particular embodiments of the subject matter have been described. Other embodiments are within the scope of the following claims. In some cases, the actions recited in the claims can be performed in a different order and still achieve desirable results. Also, the processes depicted in the accompanying figures do not necessarily require the particular order shown, or sequential order, to achieve desirable results. In certain implementations, multitasking and parallel processing may be advantageous.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

We claim:

1. A method for automatically generating unique identifiers for text fields associated with online website interactions, comprising:
    monitoring one or more text fields of a webpage;

receiving field data associated with the one or more text fields;

constructing, from the field data, one or more data feature vectors;

classifying the field data based on corresponding functional groups;

constructing a text field dataset using the one or more data feature vectors having contextual pattern similarities;

labeling the text field dataset based, at least in part, on the functional groups;

automatically selecting a keystroke dynamics algorithm based on the labeling;

processing the field data using the keystroke dynamics algorithm; and outputting an indication of authentication or fraud based on the processing.

2. The method of claim 1, further comprising:

receiving metadata associated with the one or more text fields;

constructing, from the metadata, one or more metadata feature vectors describing the text fields; and clustering by similarity, the one or more metadata feature vectors into the functional groups, each of the functional groups having an associated centroid, wherein classifying the field data is based on applying a statistical distance metric to compare the one or more data feature vectors to centroids of corresponding functional groups.

3. The method of claim 2, wherein the metadata comprises one or more of a unique identifier, a randomly generated identifier, an HTML identifier, a CSS tag, a static text field identifier, behavioral biometrics data, one or more JavaScript events, and one or more labeled text fields of a JavaScript Software Development Kit (SDK).

4. The method of claim 2, wherein the one or more metadata feature vectors comprise one or more of text field size, relative position, coordinates, field ordering, pre-filled letters, one or more parent HTML tags, and one or more children HTML tags.

5. The method of claim 2, wherein the statistical distance metric is configured to determine a similarity measure between the data feature vectors and the centroids of the functional groups, and wherein the centroids are adjusted to map to a predetermined or automatically determined number of groups.

6. The method of claim 2, wherein the metadata is associated with multiple users of the website.

7. The method of claim 1, wherein the monitoring is performed using one or more of a Software Development Kit (SDK) and an Application Programming Interface (API) to collect one or more of behavioral biometrics data, JavaScript events, and metadata associated with text fields of the webpage.

8. The method of claim 1, further comprising matching classified field data to one or more existing user profiles, wherein automatically selecting the keystroke dynamics algorithm is further based on the matching.

9. The method of claim 1, wherein a text field ID is used for labeling a dataset field of the text fields when the text field ID remains unchanged among different builds and associated deployments of a frontend of the website.

10. A system for collecting behavioral biometrics data, JavaScript events, and text field metadata for automatically generating unique identifiers for text fields associated with online website interactions, the system comprising:

a processor;

a JavaScript SDK module configured to collect data and metadata of a monitored webpage from multiple users of a website;

a feature construction module configured to construct feature vectors from text fields of the data;

a clustering module configured to partition the data into functional groups having similarities;

a feature selection module configured to select features of the feature vectors across multiple users to classify field data in a classification phase;

a comparison module configured to compare field data feature vectors to created centroids of the functional groups using a statistical distance metric;

a classification module configured to classify the field data based on the comparison to the centroids;

a matching module configured to match the classified field data against existing profiles;

a dataset construction module configured to construct a dataset of text fields based on similar contextual patterns;

a labeling module configured to label the text fields with names based on functional groups; and a behavioral biometrics module configured to analyze keystroke dynamics associated with the data.

11. The system of claim 10, wherein constructing the dataset of the text fields comprises constructing the feature vectors based on data type separation having similar contextual patterns.

12. The system of claim 10, further comprising:

a memory having programming instructions stored thereon, which, when executed by the processor, cause the processor to:

monitor one or more of the text fields of the webpage;

receive the field data associated with the text fields;

construct, from the field data, the field data feature vectors;

classify the field data based on the corresponding functional groups;

construct a text field dataset using one or more of the data feature vectors having contextual pattern similarities;

label the text field dataset based, at least in part, on the functional groups;

automatically select a keystroke dynamics algorithm based on the labeling;

process the field data using the keystroke dynamics algorithm; and output an indication of authentication or fraud based on the processing.

13. The system of claim 12, wherein the programming instructions further cause the processor to:

receive, via the JavaScript SDK module, metadata associated with text fields of a monitored page from multiple users of the website;

construct, via the feature construction module, and from the metadata, one or more metadata feature vectors describing the text fields;

cluster, via the clustering module, and by similarity, the one or more metadata feature vectors into partitioned functional groups, each of the partitioned functional groups having an associated centroid;

receive, via the JavaScript SDK module, new field data;

construct, via the feature construction module, and from the new field data, one or more data feature vectors;

classify, via the classification module, the new field data based on applying a statistical distance metric by comparing, via the comparison module, the one or more data feature vectors to the centroids of the functional groups;

construct, via the dataset construction module, a text field dataset using the one or more data feature vectors having contextual pattern similarities;

label, via the labeling module, the text field dataset based, at least in part, on the functional groups; and authenticate a user or detect potential fraudulent behavior via the behavioral biometrics module, by automatic selection of a keystroke dynamics algorithm based on the label;

and by analysis of the new field data by the keystroke dynamics algorithm.

14. A method for automatic determination of a type of information in a text field associated with online website interactions, the method comprising:

collecting, from a plurality of user devices, keystroke data related to user interaction with text fields of a monitored page from multiple users of a website;

constructing feature vectors from data entered into the text fields, the feature vectors representing data type separations having similar contextual patterns;

applying a clustering algorithm to the feature vectors to create centroids for each distinct contextual pattern into functional groups; and training one or more user profiles for each functional group.

15. The method of claim 14, further comprising:

receiving new field data;

constructing, from the new field data, one or more data feature vectors;

classifying the new field data based on applying a statistical distance metric to compare the one or more data feature vectors to the centroids of the functional groups;

determining the type of the new field data based on a minimum statistical distance of the one or more data feature vectors to the centroids of the functional groups;

matching the new field data against a corresponding profile for a user;

selecting a keystroke dynamics algorithm based on the type of the new field data; and applying the selected keystroke dynamics algorithm to the new field data for authentication or fraud detection.

16. The method of claim 15, wherein the feature vectors are constructed from collected text data using one or more behavioral biometrics algorithms, wherein the feature vectors represent one or more of keypress times, key flight times, key rollover times, durations spent waiting, typing and navigating, and control keys used in entering text.

17. The method of claim 15, wherein applying the clustering algorithm further partitions the feature vectors such that the data entered into the text fields having feature similarity above a threshold are placed in same functional group.

18. The method of claim 15, wherein the feature vectors comprise a proportion of numbers to characters, chunks and gaps of typed keystroke sequences, a proportion of keystrokes to total number of characters in the field, frequency of keystrokes over time, and a proportion of control characters to identify a kind of information.

19. The method of claim 15, wherein the functional groups comprise free text, telephone numbers, addresses, email addresses, usernames, and passwords.

20. The method of claim 15 wherein the profiles are trained based on functional groups from the clustering.

* * * * *